United States Patent
Qiu et al.

(10) Patent No.: US 12,379,776 B2
(45) Date of Patent: Aug. 5, 2025

(54) METHOD OF CONTROLLING WEARABLE DEVICE, WEARABLE DEVICE AND COMPUTER-READABLE STORAGE MEDIUM

(71) Applicant: GOERTEK INC., Shandong (CN)

(72) Inventors: Xudong Qiu, Shandong (CN); Hongyan Tao, Shandong (CN); Chao Zhang, Shandong (CN)

(73) Assignee: GOERTEK INC., Weifang (CN)

(*) Notice: Subject to any disclaimer, the term of this patent is extended or adjusted under 35 U.S.C. 154(b) by 0 days.

(21) Appl. No.: 18/557,683

(22) PCT Filed: Jun. 27, 2022

(86) PCT No.: PCT/CN2022/101382
§ 371 (c)(1),
(2) Date: Oct. 27, 2023

(87) PCT Pub. No.: WO2023/274103
PCT Pub. Date: Jan. 5, 2023

(65) Prior Publication Data
US 2024/0211041 A1   Jun. 27, 2024

(30) Foreign Application Priority Data
Jun. 29, 2021 (CN) .......................... 202110732349.4

(51) Int. Cl.
*G06F 3/01*   (2006.01)
*G06F 1/3231*   (2019.01)
*G09G 3/00*   (2006.01)

(52) U.S. Cl.
CPC ............ *G06F 3/013* (2013.01); *G06F 1/3231* (2013.01); *G09G 3/001* (2013.01); *G09G 2330/021* (2013.01); *G09G 2354/00* (2013.01)

(58) Field of Classification Search
CPC ....... G06F 3/013; G06F 1/3231; G09G 3/001; G09G 2330/021; G09G 2354/00
See application file for complete search history.

(56) References Cited

U.S. PATENT DOCUMENTS

2016/0166146 A1* 6/2016 Sarkar ................. G02B 26/101
    351/210
2018/0075820 A1   3/2018 Hicks et al.
(Continued)

FOREIGN PATENT DOCUMENTS

CN   109613984 A   4/2019
CN   109766011 A   5/2019
(Continued)

OTHER PUBLICATIONS

International Search Report from International Application No. PCT/CN2022/101382 mailed Aug. 31, 2022.

*Primary Examiner* — Benjamin C Lee
*Assistant Examiner* — Nathan P Brittingham
(74) *Attorney, Agent, or Firm* — Shih IP Law Group, PLLC

(57) ABSTRACT

The present disclosure discloses a method of controlling a wearable device, a wearable device and a computer-readable storage medium, the method of controlling a wearable device includes: scanning an eyeball of a user to determine a position of a point of attention the eyeball looks at; and adjusting at least one of an image rendering ratio of a display screen of the wearable device and an image rendering frequency of the display screen according to the position of the point of attention. The method of controlling a wearable device can reduce the power consumption of the wearable device.

8 Claims, 2 Drawing Sheets

(56) References Cited

U.S. PATENT DOCUMENTS

2019/0113970 A1    4/2019  Nijs et al.
2022/0019282 A1*  1/2022  Zhou ..................... G06F 1/3265

FOREIGN PATENT DOCUMENTS

| CN | 109885176 A | | 6/2019 | |
|---|---|---|---|---|
| CN | 110347265 A | | 10/2019 | |
| CN | 110855972 A | * | 2/2020 | ........... H04N 13/122 |
| CN | 111556305 A | | 8/2020 | |
| CN | 111757090 A | | 10/2020 | |
| CN | 112164016 A | | 1/2021 | |
| CN | 113485546 A | | 10/2021 | |

* cited by examiner

METHOD OF CONTROLLING WEARABLE DEVICE, WEARABLE DEVICE AND COMPUTER-READABLE STORAGE MEDIUM

The present disclosure claims a priority to a Chinese Patent Application No. 202110732349.4, titled "a method of controlling a wearable device, a wearable device and a computer-readable storage medium" filed in China Patent Office on Jun. 29, 2021, the entire contents thereof are incorporated into the present disclosure by reference.

TECHNICAL FIELD

The present disclosure relates to a technical field of a wearable device, and in particular to a method of controlling a wearable device, a wearable device and a computer-readable storage medium.

DESCRIPTION OF RELATED ART

Wearable devices such as an Augmented Reality (AR) device and a Virtual Reality (VR) device can analog, simulate and then superpose physical information (such as vision, sound, taste, touch, etc.) that is originally difficult to experience within certain time and space scopes in the real world by science and technology such as computers, such that virtual information is applied to the real world and sensed by human senses, to achieve sensory experience beyond reality.

Currently, superposition and anchoring of the virtual information are achieved by spatial perception and image rendering technologies. Therefore, a lot of image rendering calculations are required, which consumes a lot of processor resources, resulting in high power consumption of the wearable device.

SUMMARY

A main purpose of the present disclosure is to provide a method of controlling a wearable device, a wearable device and a computer-readable storage medium, aiming at reducing the power consumption of the wearable device.

To achieve the above purpose, the present disclosure provides a method of controlling a wearable device including:
scanning an eyeball of a user to determine a position of a point of attention the eyeball looks at; and
adjusting at least one of an image rendering ratio of a display screen of the wearable device and an image rendering frequency of the display screen according to the position of the point of attention.

In an embodiment, adjusting at least one of an image rendering ratio of a display screen of the wearable device and an image rendering frequency of the display screen according to the position of the point of attention includes:
if the position of the point of attention is not in a display region of the display screen of the wearable device, reducing at least one of the image rendering ratio of the display screen of the wearable device and the image rendering frequency of the display screen.

In an embodiment, adjusting at least one of an image rendering ratio of a display screen of the wearable device and an image rendering frequency of the display screen according to the position of the point of attention includes:
if the position of the point of attention is in a display region of the display screen of the wearable device, determining whether the position of the point of attention is in a region of interest of the display screen, wherein the region of interest is in the display region, and an area of the region of interest is smaller than an area of the display region; and
if the position of the point of attention is not in the region of interest, reducing at least one of the image rendering ratio of the display screen of the wearable device and the image rendering frequency of the display screen.

In an embodiment, adjusting at least one of an image rendering ratio of a display screen of the wearable device and an image rendering frequency of the display screen according to the position of the point of attention includes:
if the position of the point of attention is in a display region of the display screen of the wearable device, obtaining a focal length of the eyeball; and
if the focal length is not in a preset range, reducing at least one of the image rendering ratio of the display screen of the wearable device and the image rendering frequency of the display screen.

In an embodiment, reducing the image rendering ratio of the display screen of the wearable device includes:
obtaining a first image rendering ratio of a sub-display region where the point of attention is located, wherein the display region includes a plurality of sub-display regions;
obtaining a position relationship between other sub-display regions of the display region except the sub-display region where the point of attention is located and the sub-display region where the point of attention is located; and
adjusting a second image rendering ratio of the other sub-display regions according to the position relationship, wherein the second image rendering ratio is smaller than the first image rendering ratio.

In an embodiment, scanning an eyeball of a user to determine a position of a point of attention the eyeball looks at includes:
transmitting, by a signal transmitter of the wearable device, a scanning signal to the eyeball, and receiving, by a signal receiver, the scanning signal reflected back from the eyeball;
obtaining a transmitting angle of the scanning signal;
determining an angle of sight of the eyeball according to the transmitting angle of the scanning signal; and
determining the position of the point of attention of the eyeball according to the angle of sight of the eyeball.

In an embodiment, determining an angle of sight of the eyeball according to the transmitting angle of the scanning signal includes:
obtaining a distance between the signal transmitter and the signal receiver;
obtaining a transmission distance of the scanning signal; and
determining the angle of sight of the eyeball according to the transmitting angle, the distance between the signal transmitter and the signal receiver and the transmission distance.

Further, for achieving the above purpose, the present disclosure also provides a wearable device including a memory, a processor and a program for controlling the wearable device stored on the memory and executable by the processor, wherein steps of the method of controlling a wearable device in any one of the above items are implemented when the program for controlling the wearable device is executed by the processor.

In an embodiment, the wearable device further includes a signal transmitter and a signal receiver, wherein the signal transmitter transmits a scanning signal to the eyeball, and the signal receiver receives the scanning signal reflected back from the eyeball.

Further, for achieving the above purpose, the present disclosure also provides a computer-readable storage medium on which a program for controlling a wearable device is stored, wherein steps of the method of controlling a wearable device in any one of the above items are implemented when the program for controlling the wearable device is executed by a processor.

The present disclosure proposes a method of controlling a wearable device, a wearable device and a computer-readable storage medium, the method of controlling a wearable device includes: scanning an eyeball of a user to determine a position of a point of attention of the eyeball; and adjusting at least one of an image rendering ratio of a display screen of the wearable device and an image rendering frequency of the display screen according to the position of the point of attention. In the present disclosure, at least one of the image rendering ratio of the display screen of the wearable device and the image rendering frequency of the display screen are adjusted according to the position of the point of attention of the eyeball, which can effectively reduce the power consumption of the wearable device.

BRIEF DESCRIPTION OF DRAWINGS

In order to illustrate the technical solutions in the embodiments of the present disclosure or the prior art more clearly, drawings required in the descriptions of the embodiments or the prior art will be introduced briefly as following. Obviously, the drawings in the following description are merely a part of the drawings of the present disclosure, and for those of ordinary skill in the art, other drawings can also be obtained from the structures illustrated in these drawings without any creative effort.

Figure 1:
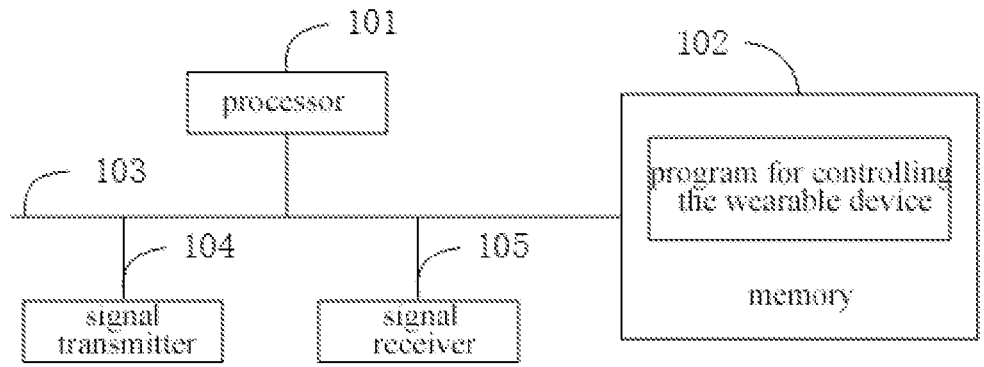
FIG. 1 is a hardware architecture diagram of a wearable device related to the technical solution of an embodiment of the present disclosure.

The achievement of the object, functional features and advantages of the present disclosure will be further described with reference to the drawing in combination with the embodiments.

DETAILED DESCRIPTIONS

The technical solution in the embodiments of the present disclosure will be described as following in combination with the drawings in the embodiments of the present disclosure. Obviously, the described embodiments are only a part of the embodiments of the present disclosure, but not all of the embodiments. Based on the embodiments of the present disclosure, all other embodiments obtained by those ordinary skilled in the art without creative labor fall within the protection scope of the present disclosure.

A main solution of the embodiment of the present disclosure includes: scanning an eyeball of a user to determine a position of a point of attention the eyeball looks at; and adjusting at least one of an image rendering ratio of a display screen of the wearable device and an image rendering frequency of the display screen according to the position of the point of attention. In this solution, at least one of the image rendering ratio of the display screen of the wearable device and the image rendering frequency of the display screen is adjusted according to the position of the point of attention the eyeball looks at, which can effectively reduce the power consumption of the wearable device.

As an implementation, please refer to FIG. 1, FIG. 1 is a hardware architecture diagram of a wearable device related to the technical solution of an embodiment of the present disclosure. As shown in FIG. 1, the wearable device may include a processor 101 (such as a CPU), a memory 102, a communication bus 103, a signal transmitter 104 and a signal receiver 105. Here, the communication bus 103 is used to implement connection and communication between these components.

The memory 102 may be a high-speed RAM memory or a non-volatile memory, such as a disk memory. As shown in FIG. 1, the memory 102 as a computer-readable storage medium may include a program for controlling the wearable device, and the processor 101 may be used to call the program for controlling the wearable device stored in the memory 102 and perform the following operations:

scanning an eyeball of a user to determine a position of a point of attention the eyeball looks at; and adjusting at least one of an image rendering ratio of a display screen of the wearable device and an image rendering frequency of the display screen according to the position of the point of attention.

In an embodiment, the processor 101 may be used to call the program for controlling the wearable device stored in the memory 102 and perform the following operations:

if the position of the point of attention is not in a display region of the display screen of the wearable device, reducing at least one of the image rendering ratio of the display screen of the wearable device and the image rendering frequency of the display screen.

In an embodiment, the processor 101 may be used to call the program for controlling the wearable device stored in the memory 102 and perform the following operations:

if the position of the point of attention is in a display region of the display screen of the wearable device, determining whether the position of the point of attention is in a region of interest of the display screen, wherein the region of interest is in the display region, and an area of the region of interest is smaller than an area of the display region; and if the position of the point of attention is not in the region of interest, reducing at least one of the image rendering ratio of the display screen of the wearable device and the image rendering frequency of the display screen.

In an embodiment, the processor 101 may be used to call the program for controlling the wearable device stored in the memory 102 and perform the following operations:

if the position of the point of attention is in a display region of the display screen of the wearable device, obtaining a focal length of the eyeball; and if the focal length is not in a preset range, reducing at least one of the image rendering ratio of the display screen of the wearable device and the image rendering frequency of the display screen.

In an embodiment, the processor 101 may be used to call the program for controlling the wearable device stored in the memory 102 and perform the following operations:

obtaining a first image rendering ratio of a sub-display region where the point of attention is located, wherein the display region includes a plurality of sub-display regions;

obtaining a position relationship between other sub-display regions of the display region except the sub-display region where the point of attention is located and the sub-display region where the point of attention is located; and adjusting a second image rendering ratio of the other sub-display regions according to the position relationship, wherein the second image rendering ratio is smaller than the first image rendering ratio.

In an embodiment, the processor 101 may be used to call the program for controlling the wearable device stored in the memory 102 and perform the following operations:

Transmitting, by a signal transmitter of the wearable device, a scanning signal to the eyeball, and receiving, by a signal receiver, the scanning signal reflected back from the eyeball;

obtaining a transmitting angle of the scanning signal;

determining an angle of sight of the eyeball according to the transmitting angle of the scanning signal; and determining the position of the point of attention of the eyeball according to the angle of sight of the eyeball.

In an embodiment, the processor 101 may be used to call the program for controlling the wearable device stored in memory 102 and perform the following operations:

obtaining a distance between the signal transmitter and the signal receiver;

obtaining a transmission distance of the scanning signal; and determining the angle of sight of the eyeball according to the transmitting angle, the distance between the signal transmitter and the signal receiver and the transmission distance.

Figure 2:
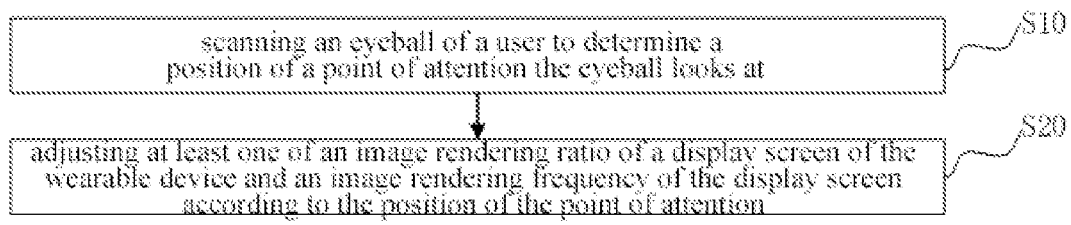
FIG. 2 is a flow diagram of a first embodiment of a method of controlling a wearable device of the present disclosure.

Referring to FIG. 2, which is a flow diagram of a first embodiment of a method of controlling a wearable device of the present disclosure, the method of controlling a wearable device includes:

Step S10, a step of scanning an eyeball of a user to determine a position of a point of attention the eyeball looks at.

In the present embodiment, the subject of execution is the wearable device, wherein the wearable device is a portable terminal device that may be worn directly on the user or integrated into the user's clothing or accessories. The wearable device may be an AR/VR device, such as AR/VR glasses, etc. Of course, in other embodiments, the wearable device may also be other portable terminal devices, such as smart watches/smart bracelets, etc., which are not limited in the present embodiment.

In the present embodiment, the wearable device such as the AR/VR device may apply virtual information to the real world to be sensed by human senses, so as to achieve sensory experience beyond reality. However, since superposition and anchoring of the virtual information require a lot of image rendering calculations, which will consume a lot of processor resources, it will undoubtedly increase the power consumption of the wearable device.

In view of this technical problem, the method of controlling a wearable device proposed by the present disclosure, based on an eyeball movement technology, builds a Micro-Electro-Mechanical System (MEMS) system on the wearable device, determines the position of the point of attention of the eyeball of the user by scanning the eyeball of the user with the MEMS, and adjusts the image rendering ratio and the image rendering frequency of the display screen of the wearable device by determining the position of the point of attention of the eyeball of the user, so as to reduce the image rendering power consumption of the wearable device.

In the present embodiment, the wearable device scans the eyeball of the user to determine the position of the point of attention, wherein the position of the point of attention means a fixation position of the eyeball of the user on the display screen of the wearable device, and the position of the point of attention may be a position mapped on the display screen of the wearable device in a direction of a pupil of the eyeball.

In the present embodiment, the wearable device is provided with a signal transmitter and a plurality of signal receivers. The signal transmitter transmits a scanning signal to the eyeball, and the signal receivers receive the scanning signal reflected back from the eyeball, so that the scanning to the eyeball is completed and the position of the point of attention of the eyeball is determined. Here, the signal transmitter is a device that can transmit the scanning signal, for example, the signal transmitter may be a scanner, a scanning device or a scanning module. The scanning signal may be an infrared signal or other invisible light signals that do not harm to the eyes and can be reflected. The signal receivers are devices that can receive the scanning signal, for example, the signal receivers may be detectors, detecting devices or detecting modules. It should be noted that, in other embodiments, the signal transmitter, the signal receiver and the scanning signal can be determined according to actual situations, which is not limited in the present embodiment.

Specifically, the signal transmitter on the wearable device transmits a scanning signal to the eyeball at a preset frequency at intervals of a preset duration, and the signal receivers receive the scanning signal reflected back from the eyeball to scan the entire eyeball. The wearable device obtains the scanning signal with the weakest reflection intensity and determines the position of the point of attention of the eyeball according to the scanning signal with the weakest reflection intensity. Here, a range of the preset duration may be 2 ms-5 ms, and a range of the preset frequency may be 200 HZ-500 HZ. Of course, in other embodiments, the preset duration and the preset frequency may be set according to actual needs, which is not limited in the present embodiment.

Step S20, a step of adjusting at least one of an image rendering ratio of a display screen of the wearable device and an image rendering frequency of the display screen according to the position of the point of attention.

In the present embodiment, after the wearable device determines the position of the point of attention of the eyeball, at least one of the image rendering ratio of the display screen of the wearable device and the image rendering frequency of the display screen is adjusted according to the position of the point of attention.

In an embodiment, if the position of the point of attention is not in a display region of the display screen of the wearable device, at least one of the image rendering ratio of the display screen of the wearable device and the image rendering frequency of the display screen is reduced. Here, the display region is a region on the display screen of the wearable device, and an area of the display region is equal to or smaller than an area of the display screen.

Specifically, when the wearable device detects that the position of the point of attention is not in the display region of the display screen, the image rendering ratio of the display screen may be reduced, the image rendering frequency of the display screen may be reduced, and the image rendering ratio and the image rendering frequency of the display screen may be reduced at the same time. Here, reducing the image rendering ratio of the display screen may include: obtaining a first image rendering ratio of a sub-display region where the point of attention is located, wherein the display region includes a plurality of sub-display regions; obtaining a position relationship between other sub-display regions of the display region except the sub-display region where the point of attention is located and the sub-display region where the point of attention is located; and adjusting a second image rendering ratio of the other sub-display regions according to the position relationship, wherein the second image rendering ratio is smaller than the first image rendering ratio. For example, the first image rendering ratio of the sub-display region where the point of attention is located may be set to 100% rendering, and in other sub-display regions, the further away from the sub-display region where the point of attention is located, the smaller the second image rendering ratio of the sub-display region, that is, the second image rendering ratio of other sub-display regions decreases in sequence according to the distance from the sub-display region where the point of attention is located. Reducing the image rendering frequency of the display screen may include adjusting the image rendering frequency of the display screen from rendering every 16.6 ms to rendering every 100 ms. Reducing the image rendering frequency of the display screen may also be achieved by adjusting the image frame rate, for example, adjusting the image frame rate from 60 fps to 10 fps.

In the present embodiment, if the position of the point of attention of the eyeball is not in the display region of the display screen of the wearable device, it indicates that the user is not watching the display region. When the user is not watching the display region, reducing at least one of the image rendering ratio of the display screen of the wearable device and the image rendering frequency of the display screen may reduce the power consumption of the wearable device, and may increase working time of the wearable device.

In an embodiment, if the position of the point of attention is in the display region of the display screen of the wearable device, whether the position of the point of attention is in a region of interest of the display screen is determined, wherein the region of interest is in the display region, and an area of the region of interest is smaller than an area of the display region; if the position of the point of attention is not in the region of interest, at least one of the image rendering ratio of the display screen of the wearable device and the image rendering frequency of the display screen is reduced. Here, the region of interest of the display screen may be an effective area that the eyeball may focus on in the display region, and the effective area that the eyeball may focus on in the display region may be determined by calibrating the eyeball through a preset eyeball calibration algorithm. Specifically, an eye-tracking camera and an IR-Led may be installed on the wearable device to identify a focusing state of the eyeball and a focusing state of the eyeball muscle. The wearable device will guide the user to perform calibration actions by a preset calibration program before use. The user observes four angles (up, down, left and right) of the display region and a position of center point, respectively, and determines the region of interest in the display region according to the calibration result. The region of interest may also be determined according to the display content in the display region, for example, the region of interest may be a foreground area of the display content, and the wearable device may automatically identify the foreground area and a background area of the display content in the display region to determine the region of interest of the display screen.

Specifically, when the wearable device detects that the position of the point of attention is in the display region of the wearable device, whether the position of the point of attention is in the region of interest of the display screen is determined. When it is detected that the position of the point of attention is not in the region of interest of the display screen, the image rendering ratio of the display screen may be reduced, the image rendering frequency of the display screen may be reduced, and the image rendering ratio and the image rendering frequency of the display screen may be reduced at the same time.

In the present embodiment, if the position of the point of attention of the eyeball is not in the region of interest, it indicates that the user does not pay attention to the display content in the display region. By reducing at least one of the image rendering ratio of the display screen and the image rendering frequency of the display screen of the wearable device, the power consumption of the wearable device may be reduced, and the working time of the wearable device may be increased.

In an embodiment, if the position of the point of attention is in the display region of the display screen of the wearable device, a focal length of the eyeball is obtained. If the focal length is not in a preset range, at least one of the image rendering ratio of the display screen of the wearable device and the image rendering frequency of the display screen is reduced. Here, the focal length of the eyeball means a distance from the eyeball to an imaging focal plane, and the focal length of the eyeball may reflect whether the user can see the display content in the display region clearly or whether the user is distracted when watching the display content in the display region. Generally, if the focal length of the eyeball is in the preset range, it indicates that the user can see the display content in the display region clearly or the user is not distracted when watching the display content in the display region. If the focal length of the eyeball is not in the preset range, it indicates that the user cannot see the display content in the display region clearly or the user is distracted when watching the display content in the display region. The preset range may be (−0.2 m, 0.2 m). Of course, in other embodiments, the preset range may be determined according to actual situations, which is not limited in the present embodiment.

Specifically, when the wearable device detects that the position of the point of attention is in the display region of the wearable device, the focal length of the eyeball is obtained and it is determined whether the focal length of the eyeball is in the preset range. If the focal length of the eyeball is not in the preset range, the image rendering ratio of the display screen may be reduced, the image rendering frequency of the display screen may be reduced, and the image rendering ratio and the image rendering frequency of the display screen may be reduced at the same time.

In the present embodiment, if the focal length of the eyeball is not in the preset range, it indicates that the user cannot see the display content in the display region clearly or the user is distracted when watching the display content in the display region. By reducing at least one of the image rendering ratio of the display screen and the image rendering frequency of the display screen of the wearable device, the power consumption of the wearable device may be reduced, and the working time of the wearable device may be increased.

In the technical solution provided in the present embodiment, the eyeball of the user is scanned to determine the position of the point of attention of the eyeball, and at least one of the image rendering ratio of the display screen of the wearable device and the image rendering frequency of the display screen is adjusted according to the position of the point of attention. In the technical solution, at least one of the image rendering ratio of the display screen of the wearable device and the image rendering frequency of the display screen is adjusted according to the fixation position of the eyeball, which can effectively reduce the power consumption of the wearable device.

Figure 3:
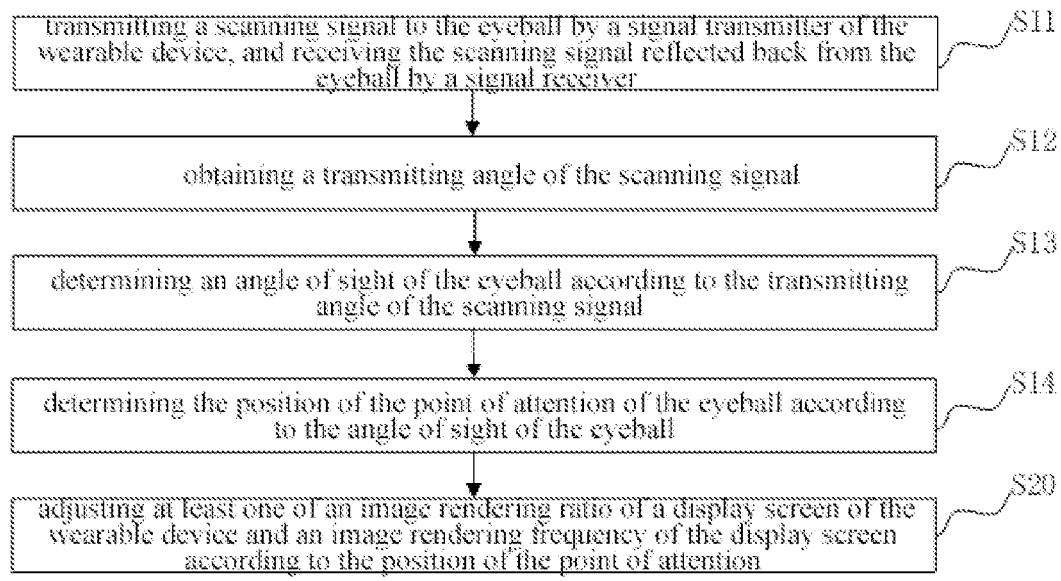
FIG. 3 is a flow diagram of a second embodiment of a method of controlling a wearable device of the present disclosure.

Referring to FIG. 3, FIG. 3 is a flow diagram of a second embodiment of a method of controlling a wearable device of the present disclosure. Based on the first embodiment, the above S10 includes the following steps:

Step S11, a step of transmitting, by a signal transmitter of the wearable device, a scanning signal to the eyeball, and receiving, by a signal receiver, the scanning signal reflected back from the eyeball.

In the present embodiment, the scanning signal is transmitted to the eyeball by the signal transmitter of the wearable device, and the scanning signal reflected back from the eyeball is received by the signal receiver. Here, the signal transmitter refers to a device that can transmit the scanning signal, for example, the signal transmitter may be a scanner, a scanning device or a scanning module. The scanning signal may be an infrared signal or other invisible light signals that do not harm to the eyes and can be reflected. The signal receiver refers to a device that can receive the scanning signal, for example, the signal receiver may be a detector, a detecting device or a detecting module. The wearable device includes at least one signal transmitter and a plurality of signal receivers. It should be noted that in other embodiments, the signal transmitter, the signal receiver and the scanning signal can be determined according to actual situations, which is not limited in the present embodiment.

Specifically, the signal transmitter on the wearable device transmits a scanning signal to the eyeball at a preset frequency at intervals of a preset duration, and the signal receiver receives the scanning signal reflected back from the eyeball to scan the entire eyeball. The wearable device obtains the scanning signal with the weakest reflection intensity and determines the position of the point of attention of the eyeball according to the scanning signal with the weakest reflection intensity. Here, a range of the preset duration may be 2 ms-5 ms, and a range of the preset frequency may be 200 HZ-500 HZ. Of course, in other embodiments, the preset duration and the preset frequency may be set according to actual needs, which is not limited in the present embodiment.

Step S12, a step of obtaining a transmitting angle of the scanning signal.

Figure 4:
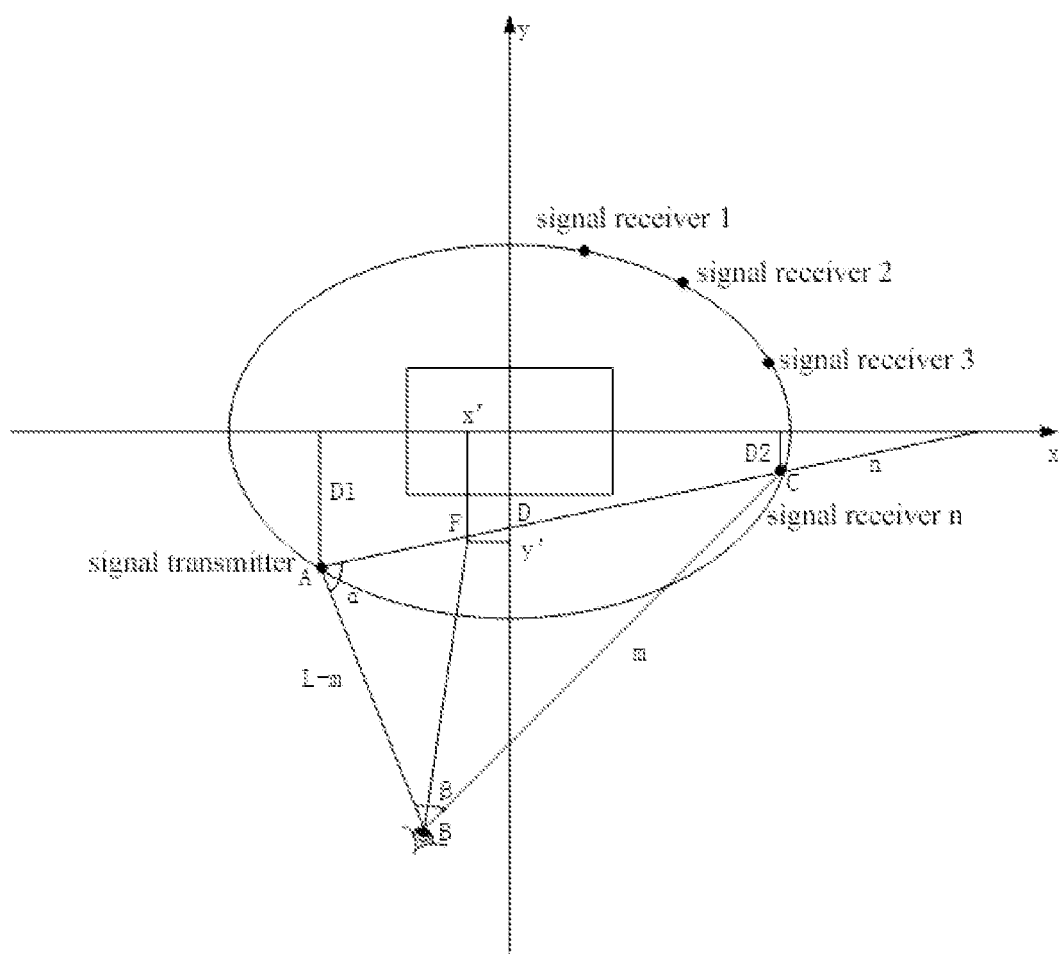
FIG. 4 is a schematic diagram for determining a position of a point of attention of an eyeball related to the technical solution of an embodiment of the present disclosure.

In the present embodiment, please refer to FIG. 4, FIG. 4 is a schematic diagram for determining a position of a point of attention of an eyeball related to the technical solution of an embodiment of the present disclosure. As shown in FIG. 4, a signal transmitter transmits a scanning signal, and the scanning signal with the weakest reflection intensity of eyeball is received by a signal receiver n. The wearable device obtains a transmitting angle of the scanning signal, wherein the transmitting angle means an angle α formed by a ray from the signal transmitter to the eyeball and a ray from the signal transmitter to the signal receiver n.

Step S13, a step of determining an angle of sight of the eyeball according to the transmitting angle of the scanning signal.

In the present embodiment, the wearable device determines an angle of sight of the eyeball according to the transmitting angle of the scanning signal, wherein the angle of sight is an angle β formed by a ray from the eyeball to the signal transmitter and a ray from the eyeball to the signal receiver n.

Specifically, the wearable device obtains a distance between the signal transmitter and the signal receiver, obtains a transmission distance of the scanning signal, and determines the angle of sight of the eyeball according to the transmitting angle, the distance between the signal transmitter and the signal receiver, and the transmission distance. Here, as positions of the signal transmitter and the signal receiver of the wearable device on the wearable device are known, a distance D between the signal transmitter and the signal receiver of the wearable device is known and can be pre-set or stored. A transmission distance L of the scanning signal can be determined by obtaining a transmission time of the scanning signal and a transmission rate of the scanning signal. The angle of sight of the eyeball is determined as follows: assuming that the transmitting angle α corresponds to a side length m, according to the cosine law, m can be obtained: $m^2 = D^2 + (L-m)^2 - 2*D*(L-m)*\cos\alpha$, and similarly, β can be obtained, $\beta = \arccos((m^2 + (L-m)^2)/2*m*(L-m))$.

Step S14, a step of determining the position of the point of attention of the eyeball according to the angle of sight of the eyeball.

In the present embodiment, the wearable device obtains the angle of sight of the eyeball and then determines the position of the point of attention of the eyeball according to the angle of sight of the eyeball. Specifically, the position of the point of attention of the eyeball is determined as follows: according to the law of cosine, $|AF|^2 = (L-m)^2 + |BF|^2 - 2*(L-m)*|BF|*\cos\beta/2$, $|BF|^2 = (L-m)^2 + |AF|^2 - 2*(L-m)*|AF|*\cos(180-\alpha-\beta/2)$, values of |AF| and |BF| can be obtained. According to the similar triangle principle, $n/(D+n) = D2/D1$, $n/(D+n) = D2/|x'F|$, |x'F| can be obtained, and similarly, |y'F| can be obtained, thus, the coordinates of point F are (x', y'). Here, the coordinates of point F is the position of the point of attention of the eyeball.

In the technical solution provided in the present embodiment, a scanning signal is transmitted to the eyeball by the signal transmitter of the wearable device, the scanning signal reflected back from the eyeball is received by the signal receiver, the transmitting angle of the scanning signal is obtained, the angle of sight of the eyeball is determined according to the transmitting angle of the scanning signal, and the position of the point of attention of the eyeball is determined according to the angle of sight of the eyeball. By this technical solution, the position of the point of attention of the eyeball can be determined accurately and the control accuracy of the wearable device is improved.

Based on the above embodiments, the present disclosure also provides a wearable device, which may include a memory, a processor, and a program for controlling the wearable device stored on the memory and running on the processor, wherein steps of the method of controlling a wearable device as described above in any one of the embodiments are implemented when the program for controlling the wearable device is executed by the processor.

In an embodiment, the wearable device also includes a signal transmitter and a signal receiver, wherein the signal transmitter may transmit a scanning signal to the eyeball, and the signal receiver may receive the scanning signal reflected back from the eyeball.

Based on the above embodiments, the present disclosure also provides a computer-readable storage medium on which a program for controlling a wearable device is stored, wherein steps of the method of controlling a wearable device as described above in any one of the embodiments are implemented when the program for controlling the wearable device is executed by a processor.

The various embodiments in the present disclosure are described in a parallel or progressive manner, and each embodiment focuses on the differences from other embodiments. The same or similar parts between each embodiment may be referred to each other. As for the device disclosed in the embodiment, the description is relatively simple since it corresponds to the method disclosed in the embodiment. The relevant information may refer to the description for method.

Those skilled in the art may also understand that the units and algorithm steps of each example described in combination with the embodiments disclosed herein may be implemented in electronic hardware, computer software or a combination of the both. In order to clearly illustrate the interchangeability of hardware and software, the composition and the steps of each example have been described generally in terms of function in the above descriptions. Whether these functions are executed in hardware or software depends on the specific application and design constraints of the technical solution. Those skilled in the art may use different methods to implement the described functions for each specific application, but such implementation should not be considered beyond the scope of the present disclosure.

The steps of the method or algorithm described in combination with the embodiments disclosed by the present disclosure may be directly implemented using hardware, software modules executed by processors or a combination of the both. The software modules may be placed in random access memory (RAM), memory, read-only memory (ROM), electrically programmable ROM, electrically erasable programmable ROM, register, hard disk, removable disk, CD-ROM, or any other form of storage medium known in the technical field.

It should also be noted that, relational terms such as first and second herein are only used to distinguish one entity or operation from another entity or operation, and do not necessarily require or imply any actual relationship or order between these entities or operations. Moreover, the terms "comprise", "include" or any other variation thereof are intended to encompass non-exclusive inclusion, such that a process, method, object or device that comprises a series of elements not only includes those elements, but also includes other elements that are not explicitly listed, or also includes elements inherent in such process, method, object or device. Without further limitations, elements limited by the statement "comprising one . . . " do not exclude the existence of other identical elements in the process, method, object or device that includes the elements.

What is claimed is:

1. A method of controlling a wearable device comprising:
    scanning an eyeball of a user to determine a position of a point of attention the eyeball looks at; and
    adjusting an image rendering ratio of a display screen of the wearable device and an image rendering frequency of the display screen according to the position of the point of attention, wherein the image rendering ratio is an image rendering resolution,
    wherein scanning an eyeball of a user to determine a position of a point of attention the eyeball looks at comprises:
    transmitting, by a signal transmitter of the wearable device, a scanning signal to the eyeball, and receiving, by a plurality of signal receivers of the wearable device, the scanning signal reflected back from the eyeball;
    determining a signal receiver n of the plurality of signal receivers with a received scanning signal having a weakest reflection intensity;
    obtaining a transmitting angle of the scanning signal, formed by a ray from the signal transmitter to the eyeball and a ray from the signal transmitter to the signal receiver n;
    determining an angle of sight of the eyeball according to the transmitting angle of the scanning signal; and
    determining the position of the point of attention of the eyeball according to the angle of sight of the eyeball.

2. The method of claim 1, wherein the adjusting the image rendering ratio of the display screen of the wearable device and the image rendering frequency of the display screen according to the position of the point of attention comprises:
    if the position of the point of attention is not in a display region of the display screen of the wearable device, reducing at least one of the image rendering ratio of the display screen of the wearable device and the image rendering frequency of the display screen.

3. The method of claim 1, wherein the adjusting the image rendering ratio of the display screen of the wearable device and the image rendering frequency of the display screen according to the position of the point of attention comprises:
    if the position of the point of attention is in a display region of the display screen of the wearable device, determining whether the position of the point of attention is in a region of interest of the display screen, wherein the region of interest is in the display region, and an area of the region of interest is smaller than an area of the display region; and
    if the position of the point of attention is not in the region of interest, reducing the image rendering ratio of the display screen of the wearable device and the image rendering frequency of the display screen.

4. The method of claim 2, wherein reducing the image rendering ratio of the display screen of the wearable device comprises:
    obtaining a first image rendering ratio of a sub-display region where the point of attention is located, wherein the display region comprises a plurality of sub-display regions;
    obtaining a position relationship between other sub-display regions of the display region except the sub-display region where the point of attention is located and the sub-display region where the point of attention is located; and
    adjusting a second image rendering ratio of the other sub-display regions according to the position relationship, wherein the second image rendering ratio is smaller than the first image rendering ratio.

5. The method of claim 1, wherein determining an angle of sight of the eyeball according to the transmitting angle of the scanning signal comprises:
    obtaining a distance between the signal transmitter and the signal receiver;
    obtaining a transmission distance of the scanning signal; and
    determining the angle of sight of the eyeball according to the transmitting angle, the distance between the signal transmitter and the signal receiver and the transmission distance.

6. A wearable device comprising a memory, a processor and a program for controlling the wearable device stored on the memory and executable by the processor,
   wherein steps of the method of claim 1 are implemented when the program for controlling the wearable device is executed by the processor.

7. The wearable device of claim 6, further comprising a signal transmitter and a signal receiver,
   wherein the signal transmitter transmits a scanning signal to the eyeball, and the signal receiver receives the scanning signal reflected back from the eyeball.

8. A computer-readable storage medium, on which a program for controlling a wearable device is stored,
   wherein steps of the method of claim 1 are implemented when the program for controlling the wearable device is executed by a processor.

\* \* \* \* \*